United States Patent
Harrisville-Wolff et al.

(10) Patent No.: US 6,950,847 B2
(45) Date of Patent: Sep. 27, 2005

(54) SERVICE PROVIDER SYSTEM FOR DELIVERING SERVICES IN A DISTRIBUTED COMPUTING ENVIRONMENT

(75) Inventors: Carol L. Harrisville-Wolff, Louisville, CO (US); Jeffrey S. Demoff, Erie, CO (US); Alan S. Wolff, Louisville, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 868 days.

(21) Appl. No.: 09/905,138

(22) Filed: Jul. 12, 2001

(65) Prior Publication Data

US 2003/0041130 A1 Feb. 27, 2003

(51) Int. Cl.[7] .............................................. G06F 13/00
(52) U.S. Cl. ....................... 709/201; 709/203; 709/217; 709/219
(58) Field of Search ................................ 709/200–203, 709/217–219, 223–224

(56) References Cited

U.S. PATENT DOCUMENTS

| | | | |
|---|---|---|---|
| 5,179,695 A | 1/1993 | Derr et al. ................... | 395/575 |
| 5,655,081 A | 8/1997 | Bonnell et al. ............. | 395/200 |
| 5,699,275 A | 12/1997 | Beasley et al. ............. | 364/514 |
| 5,752,042 A | 5/1998 | Cole et al. ................... | 395/712 |
| 5,790,777 A | 8/1998 | Izuta et al. ............ | 395/183.21 |
| 5,978,373 A | 11/1999 | Hoff et al. | |
| 6,009,274 A | 12/1999 | Fletcher et al. ............. | 395/712 |
| 6,110,228 A | 8/2000 | Albright et al. ............... | 717/11 |
| 6,125,372 A | 9/2000 | White ......................... | 707/205 |
| 6,128,624 A | 10/2000 | Papierniak et al. | |
| 6,167,567 A * | 12/2000 | Chiles et al. ................ | 717/173 |
| 6,301,710 B1 * | 10/2001 | Fujiwara ..................... | 717/175 |
| 6,341,287 B1 * | 1/2002 | Sziklai et al. ............... | 707/102 |
| 6,408,434 B1 * | 6/2002 | Fujiwara ..................... | 717/170 |
| 6,542,943 B2 * | 4/2003 | Cheng et al. ................. | 710/36 |
| 6,611,498 B1 * | 8/2003 | Baker et al. ................. | 370/252 |
| 6,691,176 B1 * | 2/2004 | Narin et al. ................. | 719/318 |
| 6,771,290 B1 * | 8/2004 | Hoyle ......................... | 715/745 |

* cited by examiner

*Primary Examiner*—Moustafa M. Meky
(74) *Attorney, Agent, or Firm*—Kent A. Lembke; William J. Kubida; Hogan & Hartson LLP (57) ABSTRACT

A service provider system adapted for distributing services, including patch selection and delivery, in a distributed computing environment. The system includes a service manager linked to the communications network that functions to obtain and store client system information from the client systems during performance of the services. A service deployment tool registers service providers by storing service proxies from the service providers that are executable code and include an interface defining the methods implemented by the service. The tool functions to transfer service proxies to the client system in response to service requests. A service selection tool processes service requests to match service proxies to select appropriate available services for the client system. The client system includes a virtual service mechanism for registering as a recipient with the service manager, transmitting the service requests, and executing the service proxies received in response to the service requests.

18 Claims, 3 Drawing Sheets

SERVICE PROVIDER SYSTEM FOR DELIVERING SERVICES IN A DISTRIBUTED COMPUTING ENVIRONMENT

BACKGROUND OF THE INVENTION

1. Field of the Invention

The present invention relates, in general, to software package, application, and/or service distribution in a distributed computer network, and, more particularly, to a system and method for monitoring and providing services for client computer systems and/or receiving client subscription requests and for responding by delivering up-to-date versions of services, such as patches, operating system (OS) and software upgrades, training, and other services, to the client computer system for execution on the client computer system independent from a central service system and without a need for constant communications.

2. Relevant Background

Distributed computing environments in which decision making, file storage, and other network functions are not centralized but are found throughout the network are increasingly popular designs for network computing. For example, distributed computing environments are employed in many existing client-server systems and peer-to-peer architectures. During typical operations, a copy of a software program or an application (i.e., an application package such as Netscape™, StarOffice™, an operating system and the like) is distributed over a data communications network by a master or central network device for installation on client network devices that request or require the particular application package. In other words, the entire software package is downloaded on the client system and becomes resident in memory (e.g., a relatively permanent portion of the client system).

When an application, such as an operating system (OS), is updated with a new version or with patches to correct identified bugs, the updates may be installed manually at the client computer system with a set of update disks. Alternatively, a client-server communication link is established and the client requests the newer version or the software or application. In some cases, a master server provides ongoing monitoring utilizing an application installed and executing (i.e., resident) on the client device to determine when updates or patches may be beneficial. In response, the master server functions to distribute and install updated application packages through one or more intermediate distribution servers and over the communications network to the appropriate client network devices, i.e., the devices utilizing the updated application. The client network device may be an end user device, such as a personal computer, computer workstation, or any electronic computing device, or be an end user server that shares the application with a smaller, more manageable number of the end user devices within the distributed computer network.

While such distributed computer networks provide a number of operational benefits, distribution and installation of the updates and new versions of software and applications to these client network devices results in a number of operating inefficiencies and problems for both the clients and the service providers. For example, correcting a failed distribution typically requires the redistribution of the package to each of the devices that did not receive the package, e.g., all devices downstream in the network from an affected or faulting device or server. To be effective, the master server must be configured to assure use of the same installation parameters (i.e., the distribution command strings), the same distribution list, and the same packages. Servicing the network prior to redistribution and replicating the distribution process has been problematic and costly because the networks often include large numbers of client network devices, such as intermediate distribution servers, end user servers, and end user devices which often have to be accessed and serviced when distribution problems occur. In addition, these various devices may run with different operating systems, further complicating distribution and installation of software on the host device or system.

Another ongoing problem with existing distributed computer environments is how to complete the initial identification of updates and new versions of applications and software that should be installed on client devices. Tools have been developed for assisting an operator of a client device in analyzing their systems and selecting from available patches and upgrades, but these tools have a number of limitations. Typically, the tool includes code or software that has to be loaded and executed on the client device, i.e., that is a disk-resident application. The analysis tool often requires dedicated memory in the client system. The analysis tool is generally interactive and the client system operator typically must provide system data for proper functioning and client operator personnel need significant knowledge of their system hardware and software elements. Hence, existing tools are often out of date and are demanding on the time and expertise of the operator's information technology personnel and, at times, on the resources of the client system.

The expertise and time of the operator personnel is further taxed because in many patch assistance tools the personnel must manually select between or approve a number of recommended patches and/or versions for installation. Unfortunately, problems can arise if patches and/or versions of applications are selected that are incompatible. Additionally, with some patch selection tools, the operator must be careful to install the patches in a specific order to avoid harming the operation of their system. Hence, the present methods of finding and then selecting between located patches can be a labor-intensive task that relies on the expertise of client personnel to be effectively completed.

Downloading and installation of the selected patches, software upgrades, or new software applications can result in further problems for the operator and the service provider. Existing distributed computing environments typically rely on the client-server model of operation in which a communication link over a data communications network is first established and then messages are transmitted between the client device and a master or central server. The messages can be thought of as static messages, such as patch installation requests from the client and code to be installed. The master server and client must effectively translate the messages. The patch or application codes are distributed to the client device for installation (i.e., to become resident) on the client device. Installation is controlled by the master server but often requires significant support by personnel at the client facility. Another concern with installation is that the operator is usually forced to interrupt ongoing client device operations and to reboot their system after installation.

Hence, there remains a need for an improved, more robust method and system for distributing and installing software, applications, and operating systems or other services and corresponding upgrades and patches to client computer systems in a distributed computing environment. Preferably such an improved method and system would be useful for remotely and automatically delivering nearly any software or hardware service useful in networked computer systems in a manner that does not burden operators of client computer systems either by reducing system operation or resource availability or by increasing the demands on personnel time or for system and software expertise.

SUMMARY OF THE INVENTION

The present invention addresses the above discussed and additional problems by providing a service provider system adapted for distributing services, including patch selection and delivery, in a distributed computing environment having a number of client systems linked to a communications network. According to an important aspect of the invention, the system includes a service manager linked to the communications network. The service manager functions to obtain and store client system information from the client systems during performance of the services.

The service manager includes a service deployment tool for registering service providers by storing service proxies received from the service providers. The service proxies are executable code (such as Java™ objects) and include an interface for defining the methods implemented by the underlying service that can be requested by client systems. The service deployment also functions to transfer selected service proxies to the client system in response to service requests. The service manager includes a service selection tool adapted for processing the service requests to match stored service proxies to select appropriate available services for the client system.

The client system includes a virtual service mechanism for registering as a recipient with the service manager, transmitting the service requests, and recognizing and executing the service proxies received in response to the service requests. During service performance, the client system communicates directly with the service provider and as dictated by the service proxy which may be configured to establish initial attributes of the provided service. Significantly, the executed service proxy is only temporarily active on the client system and the services provider system is operable to dispose of or remove the service proxy from the client system upon completion of the service. The service may be adapted for automated completion without client system operator interaction or to poll the operator for input or confirmation of intended methods. For example, in a patch delivery service, the operator may be requested to confirm installation of a recommended patch or the installation may be completed without input and the system rebooted upon after installation.

According to another aspect of the invention, a patch and upgrade distribution method is provided for automatically selecting and installing patches and OS or application upgrades on a client system. The method includes storing a patch and upgrade delivery proxy (i.e., executable code with an interface defining requestable methods) corresponding to an implemented patch and upgrade service. The method also includes registering a client server as a recipient for the implemented patch and upgrade service. The patch and upgrade delivery proxy is transferred to the client server for execution to initiate performance of the implemented patch and upgrade service at the client server. The method may also include communicatively linking the client server and a service provider having the implemented patch and upgrade service and transferring executable code and data between the client server and the service provider during the performance of the patch and upgrade service at the client server.

DETAILED DESCRIPTION OF THE PREFERRED EMBODIMENTS

Briefly stated, the present invention addresses prior problems in delivering services that require operator time and expertise and client system resources by providing a service provider system in which service providers are linked to client systems via a communication network to provide automated services at the client systems. Significantly, the service provider system includes one or more service managers that respond to client requests (e.g., subscriptions or one-time requests) by operating a service deployment mechanism to deliver executable code to the requesting client system and not simply to communicate static messages as is the case with many prior art service schemes (e.g., typical client-server arrangements). The service managers also include data collection mechanisms for collecting and storing client system information and client request history information for use in providing the current service and in marketing, selecting, and providing future services in an individualized manner to each client.

The client systems typically include a virtual service mechanism (such as a Java™ virtual machine) that is capable of understanding and executing the executable code or object that underlies and provides the delivered service without, or with minimal, operator interaction or support. The delivered service, e.g., a service proxy, continues to execute on the client system only until features of the particular service have been provided and then is removed from the client system. The service provider system effectively provides distributed services to remote client systems without placing personnel or resource demands on the client operator.

Figure 1:
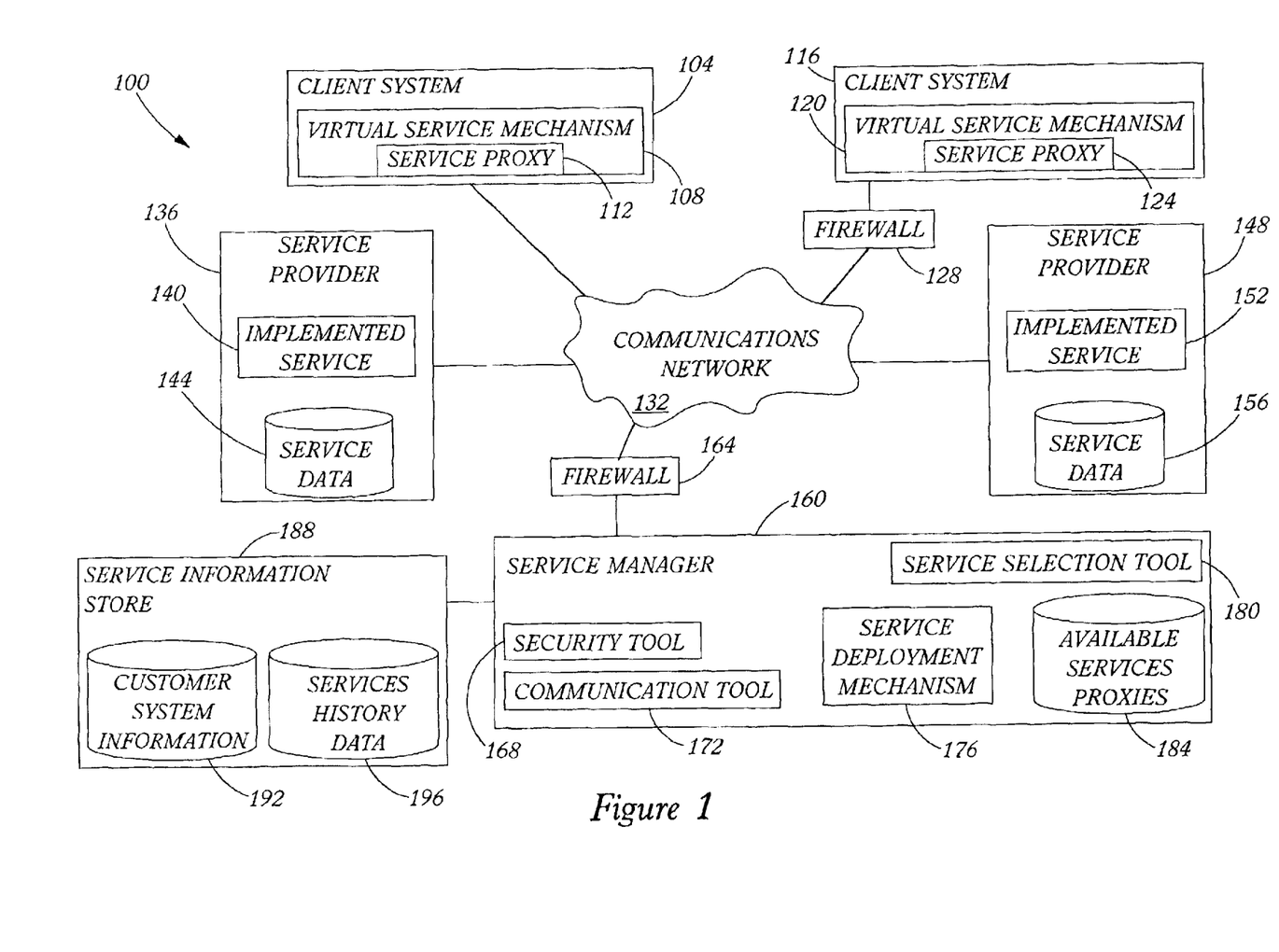
FIG. 1 illustrates a service provider system for maintaining an up-to-date database of available services and for responding to user service requests by distributing or initiating services at the client system.
Figure 2:
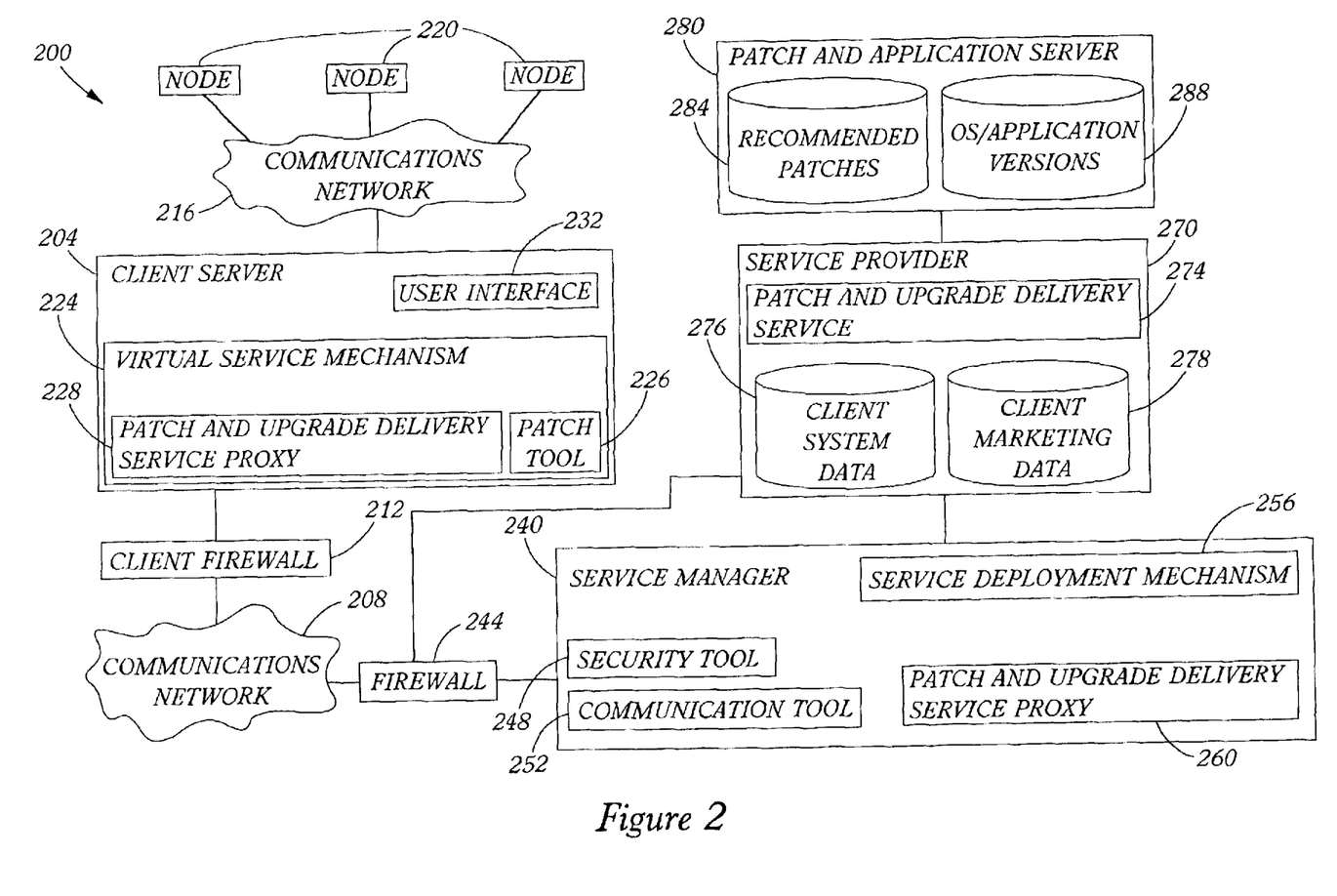
FIG. 2 illustrates a service provider system adapted for providing a patch delivery and application upgrade service to clients according to the invention.
Figure 3:
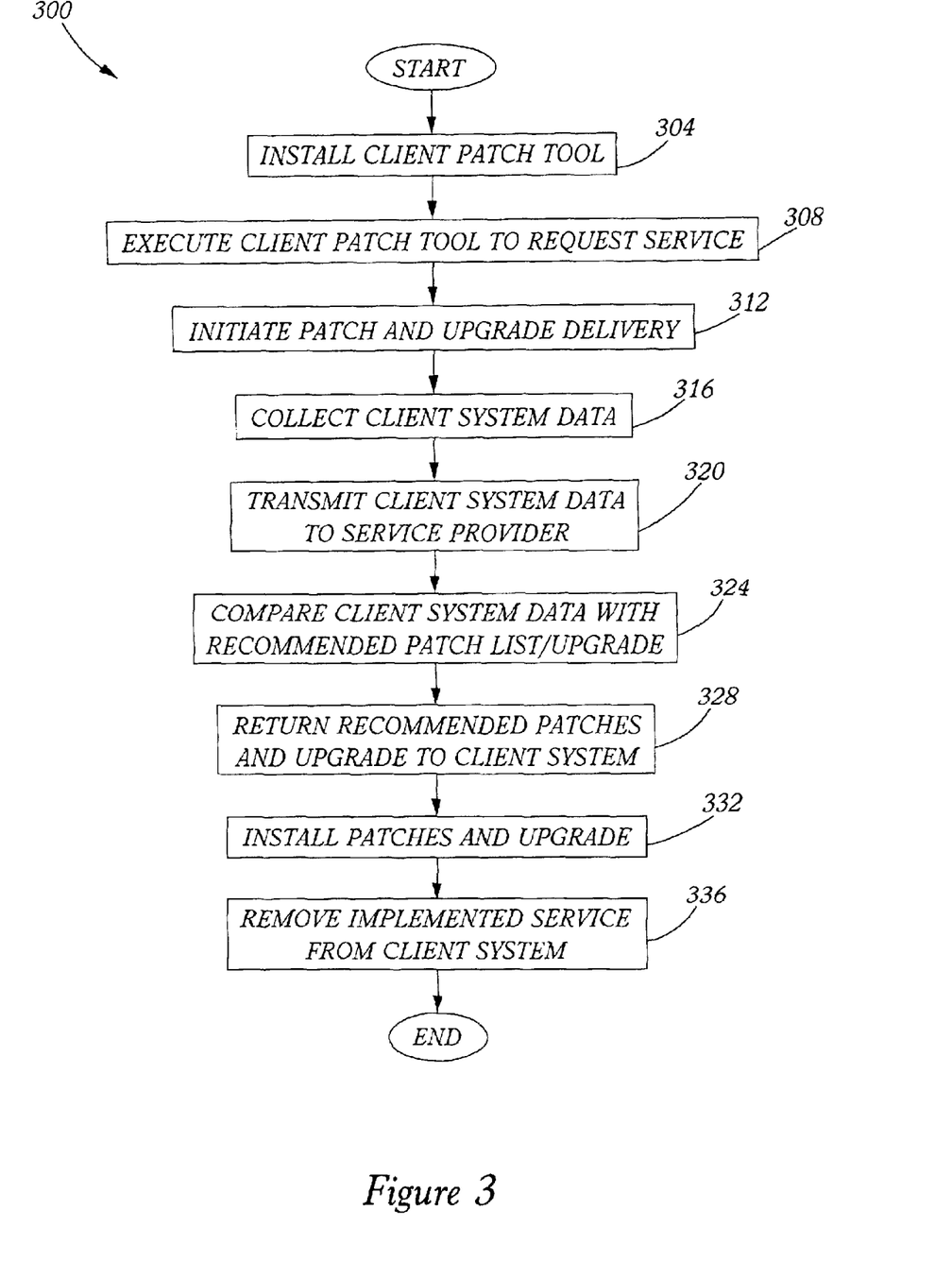
FIG. 3 is a flow diagram showing exemplary operation of the service provider system of FIG. 2.

To provide a better understanding of the present invention, the service provider system is described generally as operating in a distributed computing network environment, as shown in FIG. 1, that includes a plurality of interacting client systems, service managers, and service providers. The description of the invention then proceeds to a more specific example of a service provider system that is configured for effectively providing patches, upgrades, and other computer system maintenance services to remote clients over a communications network, as shown in FIGS. 2 and 3. From the general description of the service provider system and a specific implementation, one skilled in the art will readily understand that the invention applies generally to the distribution of services within a distributed computing network. Hence, the present invention is not limited to the delivery of patches and system maintenance but applies generally to systems for providing distributed services.

FIG. 1 illustrates one embodiment of a service provider system 100 useful for managing distribution of services, such as patch analysis and installation, client training, software upgrade installation and recommendation, and other service, throughout a computer network. In this regard, a service manager 160 is provided that is configured to, among other tasks, maintain a registrar of available services within the network, to receive service requests from clients, to select and configure a matching service, and to deliver the service to the requesting client.

The functions and operation of the service manager 160 are described in a distributed, de-centralized computer network environment in which service proxies (i.e., executable code or objects) are transferred and run on client devices. The distributed, object-oriented service provider system 100 is a highly useful implementation of the invention that allows services, such as patch selection and installation, to be more effectively completed than was possible in client-server models in which the server controlled the progress of the service and/or required a large involvement by client personnel. Those skilled in the computer and networking arts will readily appreciate that the service manager 160 with its features is transferable to many data communication systems that utilize distributed, object-oriented computing techniques. These variations to the exemplary service provider system 100 and service manager 160 are considered within the breadth of the following disclosure and claims.

As illustrated, the service provider system 100 includes a number of client systems 104, 116, service providers 136, 148 and a service manager 160 that are all in communication via the communications network 132 (e.g., the Internet, a LAN, a WAN, and the like) or other communications links (not shown). In the following discussion, network devices, such as client systems 104, 116, service providers 136, 148, and service manager 160, will be described in relation to their function rather than as particular electronic devices and computer architectures. To practice the invention, the computer devices and network devices may be any devices useful for providing the described functions, including well-known data processing and communication devices and systems such as personal computers with processing, memory, and input/output components and server devices configured to maintain and then distribute executable code over a data communications network. The communication links may be any suitable data communication link, wired or wireless, for transferring digital data between two electronic devices. Data is typically communicated in digital format following standard protocols, such as TCP/IP, but this is not intended as a limitation of the invention.

The client systems 104, 116 shown include virtual service mechanisms 108, 120 for recognizing and executing service proxies 112, 124. Although not shown, the client systems 104, 116 typically will include one or more user nodes each utilizing an operating system (OS) with user interfaces (e.g., command line interfaces, graphical user interfaces, and the like) and running applications and including installed patches. The virtual service mechanisms 108, 120 in one embodiment are Java™ virtual machines configured in a universal format with a Java runtime interpreter that enables the mechanisms 108, 120 to execute compiled Java™ byte-code or J-code (i.e., executable code) that is delivered by the service manager 160 as a service proxy 112, 124. The virtual service mechanism 108, 120 may also include additional architecture to support providing remote services such as a Jini™ technology agent. The virtual service mechanism 108, 120 is further configured to protect the client system 104, 116 from viruses that could come with downloaded code by restricting the service proxy 112, 124 and other received executable code to a limited set of operations set by the virtual service mechanism 108, 120. The invention is not limited to this embodiment, however, and is useful with other virtual machines configured for receiving and executing executable code in the form of service proxies 112, 124.

Significantly, the service proxy 112, 124 is executable code (such as an object) that defines, for example by type, and implements a service implementation provided by one of the service providers 136, 148. The service proxy 112, 124 typically will include a service interface that defines which methods or functions the service implementation provides. The service proxy 112, 124 is only active or running on the client system 104, 116 while the service is being provided and is automatically removed by the virtual service mechanism 108, 120 (e.g., in garbage collection) when the proxy 112, 124 is no longer needed. In other words, the service proxy 112, 124 executes on the client system 104, 116 to communicate directly with the service provider 136, 148 and to perform a set of functions or methods. Once these are completed, any memory and resources of the client system 104, 116 required to provide the service are released or freed up and the proxy 112, 124 is not resident on the system 104, 116.

During operation, the client system 104, 116 via the virtual service mechanism 108, 120 forwards service requests to the service manager 160. The service requests may be through one or more firewalls 128, 164. The service requests typically will include information indicating the type of service desired or the functions the service preferably will perform. The service request information preferably is adequate to allow the service manager 160 to match or filter the service requests against services that have been registered with the service manager 160 and are known to be available. The services generally represent software applications and hardware devices that provide one or more operations for a client system. In one embodiment, a service is a Jini™ technology-enabled service that appears programmatically as an object and has an interface that defines the operations that can be requested and then performed by that service. The operations provided are numerous and may vary widely and may include system maintenance (e.g., patch selection and installation, application and OS upgrades, and hardware analysis), computer training, new product information and marketing, and the like.

The service providers 136, 148 are linked to the communications network 132 to allow communication with the service manager 160 and direct communication with the client systems 104, 116 when providing a service. The service providers 136, 148 may comprise a server device operable to execute an implemented service 140, 152 (such as an executing object providing the functions of the service). The service providers 136, 148 operate to communicate with the service manager 160 to register their implemented service 140, 152 with the service manager 160.

Typically, the service provider 136, 148 acts to discover each service manager linked to the network 132 through which it desires to offer services and to register with each. In one embodiment, registration includes transferring a service proxy of the implemented service 140, 152 to the service manager 160 and may include obtaining a lease at the service manager 160 and maintaining the lease to remain listed as an available service. The service providers 136, 148 further may include service data 144, 156 in memory (within the same server device or in a separate data store). The service data 144, 156 generally includes data or information useful in providing the implemented service 140, 152. For example, if the implemented service 140, 152 includes upgrading software applications, the service data 144, 152 may include a listing of available versions and the application versions or if the implemented service 140, 152 includes providing training, the service data 144, 152 would include training data related to various computing or other training topics.

The service provider system 100 further includes the service manager 160 which functions to respond to service requests by selecting and providing services to the requesting client systems 104, 116. In this regard, the service manager 160 includes a security tool or manager 168 to ensure that during communications and calls to maintain a security policy file and to verify security aspects of service requests received from client systems 104, 116 and of service proxies received from service providers 136, 148. The service manager 160 also includes a communication tool 172 to enable communication between the devices in the system 100 and to allow remote invocation of methods. For example, the service manager 160 may implement Java™ remote method invocation (RMI) to provide security and communication mechanisms. In this exemplary embodiment, the services may be transferred within the service provider system 100 as Java™ objects using the RMI protocol.

A service deployment mechanism 172 is provided along with memory for storing available service proxies 184. In operation, the service deployment mechanism 176 operates to receive registration requests from service providers 136, 148 and to register services for use in system 100. Registration of a service provider 136, 148 may be accomplished in a number of ways, such as receiving and storing a service proxy from each of the service providers 136, 148 in the available services proxies store 184. The service deployment mechanism 176 preferably also operates to lease out this storage space 184 by monitoring which of the service providers 136, 148 continue to actively provide the registered service, e.g., have retained their lease.

Importantly, the combination of registering newly active service providers 136, 148 and retaining only those providers 136, 148 that remain active provides advantages for the system 100. The list of services or available service proxies 184 is maintained current as unavailable services are removed on an ongoing basis. Further, the services provided are the most current or upgraded versions of the service. The available service proxies 184 do not lock the service to a set of software and hardware but instead as long as the service interface of the proxies 184 remains implemented correctly the details of the implemented service 140, 152 can change and be updated. The service manager 160 is self-corrective because network or other communication problems that result in a loss of access to a service provider 136, 148 lead to a loss of a lease and removal of the service from storage 184.

As noted above, the stored service proxies in the memory 184 are executable code that define the interfaces, initial attributes, and operations of the service and which when transferred by the service deployment mechanism 176 to a client system 104, 116 allow the service to be provided through interactions between the service providers 136, 148 and the client systems 104, 116. The service provider 136, 148 dictates where the proxy code for the registered service is to be loaded (which allows it to act as an HTTP server or to rely on a separate server device). Significantly, the service manager 160 does not take an active role in providing the service after the service proxy 184 is transferred.

Note, implemented service proxies 112, 124 may be adapted to collect software and hardware information for the client systems 104, 116. For example, if the service provided includes patch analysis and installation, the service proxies 112, 124 preferably will be configured to collect system information on the operating system, installed patches and applications, hardware, and the like and to transfer this information to the service manager. The service provider system 100 includes a service information store 188 with memory for storing the customer system information 196 obtained by the service manager 160.

The service manager 160 may further be adapted to store service requests and other information obtained from clients in a service history database 196 in store 188. For example, it may be useful to track which services have been requested by particular clients for use in future service selections or to provide directed marketing of new services as they become available.

The service manager 160 further includes a service selection tool 180 for matching the service request received from the client system 104, 116 with one of the available services proxies 184. This matching may involve filtering the available services proxies 184 based on methods or functions included in the service request. A listing of the matching services may then be provided to the client or alternatively, the most closely matching service proxy 184 may be transferred to the client system 104, 116 automatically. Instead of waiting for a service request, the service manager 160 may operate to evaluate previously gathered customer system information 192 and services history data 196 to recommend services to client systems 104, 116. Such recommendation may be performed as new service proxies 184 are registered or simply on a periodic basis selected to properly inform operators of the client systems 104, 116 of currently available services from service providers 136, 148. In the above manner, the service manager 160 effectively functions to maintain a listing of available services and to respond to client service requests by initiating a service session by transferring a matched or looked up service proxy to the client system 104, 116.

During operation of the service provider system 100, the client system 104, 116 receives and executes or invokes the service proxy 112, 124 in the virtual service mechanism 108, 120. The client system 104, 116 then communicates directly with the appropriate service provider 136, 148 rather than with the service manager 160. The service proxy 112, 124 begins providing the underlying and requested service by forwarding requests to and/or invoking the corresponding service provider's 136, 148 methods of the implemented service 140, 152. Additionally, data and client-specific information is often passed from the client systems 104, 116 to the service providers 136, 148 as part of the providing the service. Once the service is completed, the service proxy 112, 124 is disposed of or removed from the client system 104, 116. In this fashion, code is dynamically, and typically without operator interaction, downloaded and executed on the client system 104, 116 as required. Further, only code that is necessary or useful for providing the particular service is downloaded, thereby making better use of memory and other system 104, 116 resources.

With a general understanding of how the invention enables services to be effectively provided in a distributed computing environment, a more specific example of a service provider system 200 adapted for providing a patch and software upgrade service will be discussed with reference to FIGS. 2 and 3.

As illustrated in FIG. 2, the service provider system 200 is especially adapted for providing automated network patch and application and OS software delivery services. The system 200 includes a typical client network linked to a communications network 208 (such as the Internet) behind a client firewall 212. The client network includes a client server 204 having a user interface (e.g., a command line, GUI, or other interface) for allowing a client operator to initiate service requests and more preferably, to provide input during interactive embodiments of the system 200. As discussed for the system 100, the client server 204 includes a virtual service mechanism 224 (e.g., providing Jini™ and Java™ virtual machine technology or other mechanisms for recognizing and implementing universal format objects or executable code).

As shown, the virtual service mechanism 224 includes a patch tool or client agent 226 that is resident on the client server 204 configured for registering or subscribing with the service manager 240 to be able to request and receive services managed or controlled by the service manager 240. Further, a patch and upgrade delivery service proxy 228 is shown to indicate that it would execute or exist temporarily on the client server 204 as the service is being provided but, as discussed previously, the proxy 228 is disposed of during system 200 garbage collection by the service manager 240 or other system 200 devices. The client network further includes a private communication network 216 (such as a LAN or WAN) and a number of nodes 220 (such as personal computers, server devices, and other electronic and computing devices).

According to a significant aspect of the invention the service provider system 200 includes a service manager 240 linked to the communications network 208 behind a firewall 244 that functions to register the client server 204 as a potential receiving party for services and to prove requested services. To provide this functionality, the service manager 240, which may be a server, includes a security tool 248 and a communication tool 252 to ensure that received and transmitted requests are configured to satisfy security and communication protocols (e.g., security and communication technologies, files, and objects provided according to RMI).

A service deployment mechanism 256 is provided for actively discovering client devices desiring and set up to receive services which are stored in memory (not shown). The mechanism 256 also discovers or receives registration requests from providers actively providing services, such as service provider 270. The service deployment mechanism 260 also is configured to look up or retrieve services that are registered with the service manager 240. The registered services provide a service proxy defining the service functions or operations and the interface and initial attributes of the service. As shown, the service provider 270 has registered with the service manager 240 and a patch and upgrade delivery proxy 260 has been stored in memory of the service manager 240.

The service manager 240 is communicatively linked to the service provider 270 by any useful data communications link. The service provider 270 is shown as a separate device but could readily be included within the same server device as the service manager 240. The service provider 270 includes an implemented service shown as the patch and upgrade delivery service 274 that typically will be an executing object. The service provider 270 is adapted for registering when active with the service manager 240 and for maintaining a lease with the service manager 240. As note earlier, the registered proxy 260 is provided by the service provider 270 and is executable code, such as a Java™ object, that includes an interface defining the methods provided and which can be requested from the service. The proxy 260 typically will also provide initial attributes for the service 274.

During operations, the service provider 270 functions to gather and store client system data 276 for use in providing the current service 274 and for future operations of the service provider 270. Also, in some embodiments, the service provider 270 acts to store client information useful for marketing 278 such as timing and content of service requests and client information (such as OS and installed applications).

As shown, the service provider system 200 also indicates that the service provider 270 may provide the service 274 by communicating with other service providers and/or computing devices. As shown, the service provider 270 is linked to a patch and application server 280 that includes a recommended patches database 284 having records of recommended patches and, in some cases, patch descriptions that allow searching and filtering for patches that are suitable for specific bugs, applications, and OS. Also, a database of OS and application versions is provided that includes most recently available OS and software applications that are available for installation on client systems. Although not shown, the patch and application server 280 may include one or more mechanisms or applications that act to assist the patch and upgrade delivery service 274 in selecting patches and upgrades from the databases 284, 288 based on service requests and collected client system data 276.

Referring now to FIG. 3, the operation of the system 200 will be discussed highlighting the functions of the system 200 that allow efficient, automatic service provision to a client server 204. The process 300 of providing a service with system 200 begins at 304 with the installation of the patch tool 226 within the virtual service mechanism 224 by downloading over the communications network 208 or by installing from storage disk. The client patch tool 226 is then initiated or executed at 308 to transmit a service request to the service manager 240 via communications network 208. In one embodiment, the service requests involve the patch tool 226 registering itself with the service manager 240 as an active client ready to receive services.

At 312, the service manager 240 initiates patch and upgrade delivery services 274 by delivering the patch and upgrade delivery proxy 260 for execution as the proxy 228 on the virtual service mechanism 224. At this point, the client server communicates directly with the service provider 270 (or as indicated by the proxy 228) to obtain and complete the service functions. In this example, the service includes sessioning of data exchanges to collect client system data 316. The collected client system data 276 includes information useful for selecting and installing patches and/or OS/application upgrading. The information preferably includes number and type of systems and computing components, installed OS, networking configurations, installed patches, applications installed, and the like. The data is stored at 276 behind the firewall 244 (although the information could also be securely stored behind client firewall 212).

At 320, the proxy 228 transfers the collected client system data to the service provider 270 for storage in memory 276. At 324, the client system data 276 is processed to determine which patches and software upgrades to recommend. The service provider 270 may perform this method by itself or through the patch and application server 280 which functions to process the client system data 276 to determine which of the recommended patches 284 to recommend for installation and which OS/application version upgrades 288 to recommend to the client server 204.

At 324, the service provider 270 via the temporarily resident proxy 228 returns recommended patches and upgrades to the client server 204. At 332, the patches and/or OS/application upgrades may be automatically installed on the client server 204 and network devices 220 as indicated without input or interaction from an operator of the client network. Alternatively, the patch and upgrade delivery service 274 and corresponding proxy 228 may be configured to act interactively with the operator of the client server 204 during installation operations. In this embodiment, the user interface 232 may be operated to display queries to the operator listing the recommended patches and upgrades and requesting the operator to select and/or confirm which patches and upgrades to install. The installation then preferably continues automatically without further operator input. In one embodiment, the process 300 further includes rebooting of the devices upon which patches and upgrades were installed to provide little or no interruption in operation of the client network.

At 336, after installation is completed, the service provider system 200 such as with the service manager 240 performs garbage collection to remove the implemented patch and upgrade delivery service proxy 228 and other related executing code from the client server memory. In other words, the service is provided with transient executable code on the client server 204 rather than with downloaded and resident software or mechanisms that are controlled by a remote service provider as is typically the case in client-server arrangements.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the service 274 may include ongoing or periodic monitoring of the client network to determine when patches and upgrades may be useful or required and then initiating patch or upgrade installation.

Further, in one embodiment of the service provider system 100, the client systems 104, 116 can subscribe through the service manager 160 to receive services from the service providers 136, 148 periodically or on an as needed basis. In this subscription embodiment, the service manager 160 or the service provider 136, 148 may be configured to track the quantity of service usage and then to invoice the client system operator based on such tracked use or alternatively the invoicing may be a flat fee dictating the volume of service that is provided by the service provider.

We claim:

1. A method for providing services to a client system in a distributed computing network, comprising:

receiving a registration request at a service manager from a service provider, the service provider being configured to provide a service in the network;

storing in memory an available service proxy corresponding to the service implemented at the service provider, the available service proxy comprising executable code and including an interface defining methods provided within the implemented service;

receiving a service request from the client system including service selection information;

comparing the service selection information to the defined methods of the available service proxy, and if a match is determined in the comparing, transferring the available service proxy to the requesting client system, wherein the client system is adapted for executing the available service proxy to initiate the implemented service.

2. The method of claim 1, further including determining on an at least periodic basis whether the service provider is providing the service and based on a non-active determination, removing the available service proxy from the memory.

3. The method of claim 1, further including downloading and installing over a communications network a client agent on the client system adapted for executing to transmit the service request to the service manager.

4. The method of claim 1, further including after completion of the implemented service removing the available service proxy from the client system.

5. The method of claim 1, wherein the transferred available service proxy is configured to collect client system data during execution and further including receiving and storing the client system information.

6. The method of claim 5, wherein the implemented service includes patch selection, delivery, and installation and further including providing the client system data to the service provider for use in the implemented service.

7. A service provider system for distributing services in a distributed computing environment, comprising:

a service information store for storing client system information including software and hardware implementation data for client computer networks; and a service manager linked to the service information store and to a communications network configured for obtaining the client system information over the communications network and for transferring the client system information to the service information store, the service manager including a service deployment tool adapted for registering service providers by storing available service proxies in memory and for deploying selected ones of the available service proxies over the communications network and further including a service selection tool adapted for filtering the available service proxies based on a service request received over the communications network to identify the selected ones for deployment, wherein the available service proxies comprise an executable object with an interface defining methods provided by implemented services at the service providers.

8. The system of claim 7, further including a client system linked to the communications network and including a virtual service mechanism adapted for transmitting service requests over the communications network to the service manager and for receiving and executing a one of the deployed available service proxies transmitted in response to the transmitted service request.

9. The system of claim 8, wherein the virtual service mechanism includes a client mechanism executing to register the client system with the service manager as a recipient for the distributed services.

10. The system of claim 8, further including a service provider registered by the service manager and comprising an implemented service corresponding to one of the stored available service proxies, wherein during execution of the one of the deployed available service proxies the client system and the service provider are communicatively linked to complete the distributed service.

11. The system of claim 10, further including means for removing the one of the deployed available service proxies from the client system.

12. The system of claim 10, wherein the implemented service comprises based on the client system information, selecting patches from a set of available patches for installation on the client system and installing the selected patches on the client system.

13. The system of claim 10, wherein the implemented service comprises analyzing the client system information to select operating system and application upgrades and installing the selected upgrades on the client system.

14. A patch and upgrade distribution method, comprising:

storing in memory a patch and upgrade delivery proxy comprising executable code and an interface defining requestable methods, wherein the patch and upgrade delivery proxy corresponds to an implemented patch and upgrade service;

registering a client server as a recipient for the implemented patch and upgrade service;

transferring the patch and upgrade delivery proxy to the client server for execution to initiate performance of the implemented patch and upgrade service at the client server;

storing client system data obtained from the client server including configuration information for a client network served by the client server; and during the performance of the patch and upgrade service, utilizing the client system data to select a patch or an upgrade and installing the selected patch or upgrade on the client network.

15. The method of claim 14, further including communicatively linking the client server and a service provider executing the implemented patch and upgrade service and transferring executable code and data between the client server and the service provider during the performance of the patch and upgrade service at the client server.

16. The method of claim 14, wherein the patch and upgrade service is configured to obtain confirmation input from an operator of the client server through a user interface displayed at the client server.

17. The method of claim 14, further including removing the transferred patch-and-upgrade proxy from the client server after completion of the performance of the patch and upgrade service at the client server.

18. The method of claim 14, further including removing the transferred patch-and-upgrade proxy from the client server after completion of the performance of the patch and upgrade service at the client server.

* * * * *

UNITED STATES PATENT AND TRADEMARK OFFICE
CERTIFICATE OF CORRECTION

PATENT NO. : 6,950,847 B2
DATED : September 27, 2005
INVENTOR(S) : Carol L. Harrisville-Wolff, Jeffrey S. Demoff and Alan S. Wolff It is certified that error appears in the above-identified patent and that said Letters Patent is hereby corrected as shown below:

Column 14,
Line 9, "The method of claim 14, further including removing the transferred patch-and-upgrade proxy from the client server after completion of the performance of the patch and upgrade service at the client server." should read:
-- The method of claim 14, wherein the patch and upgrade service is configured to automatically reboot portions of the client network affected by the installation of the selected patch or upgrade. --.

Signed and Sealed this

Twenty-seventh Day of December, 2005

JON W. DUDAS
*Director of the United States Patent and Trademark Office*